UNITED STATES PATENT OFFICE.

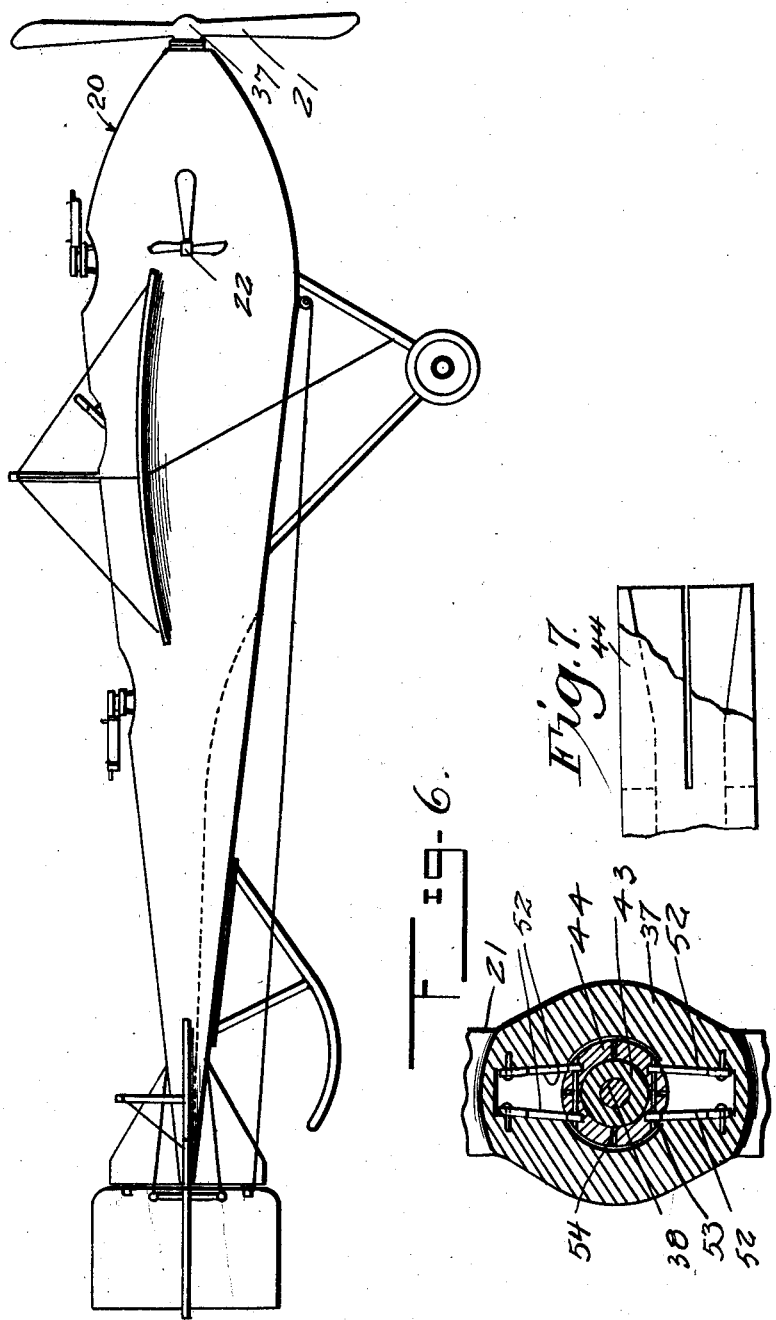

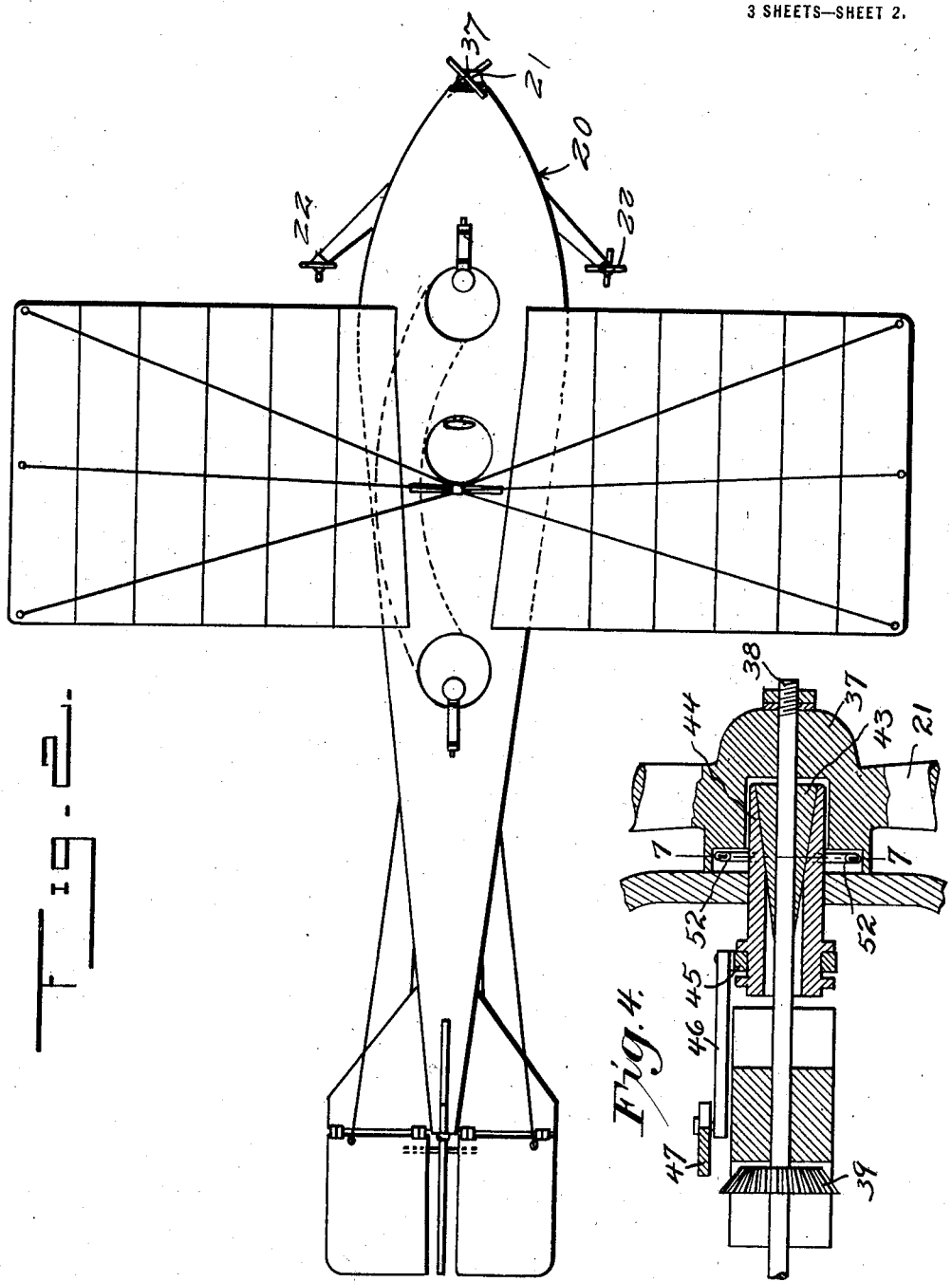

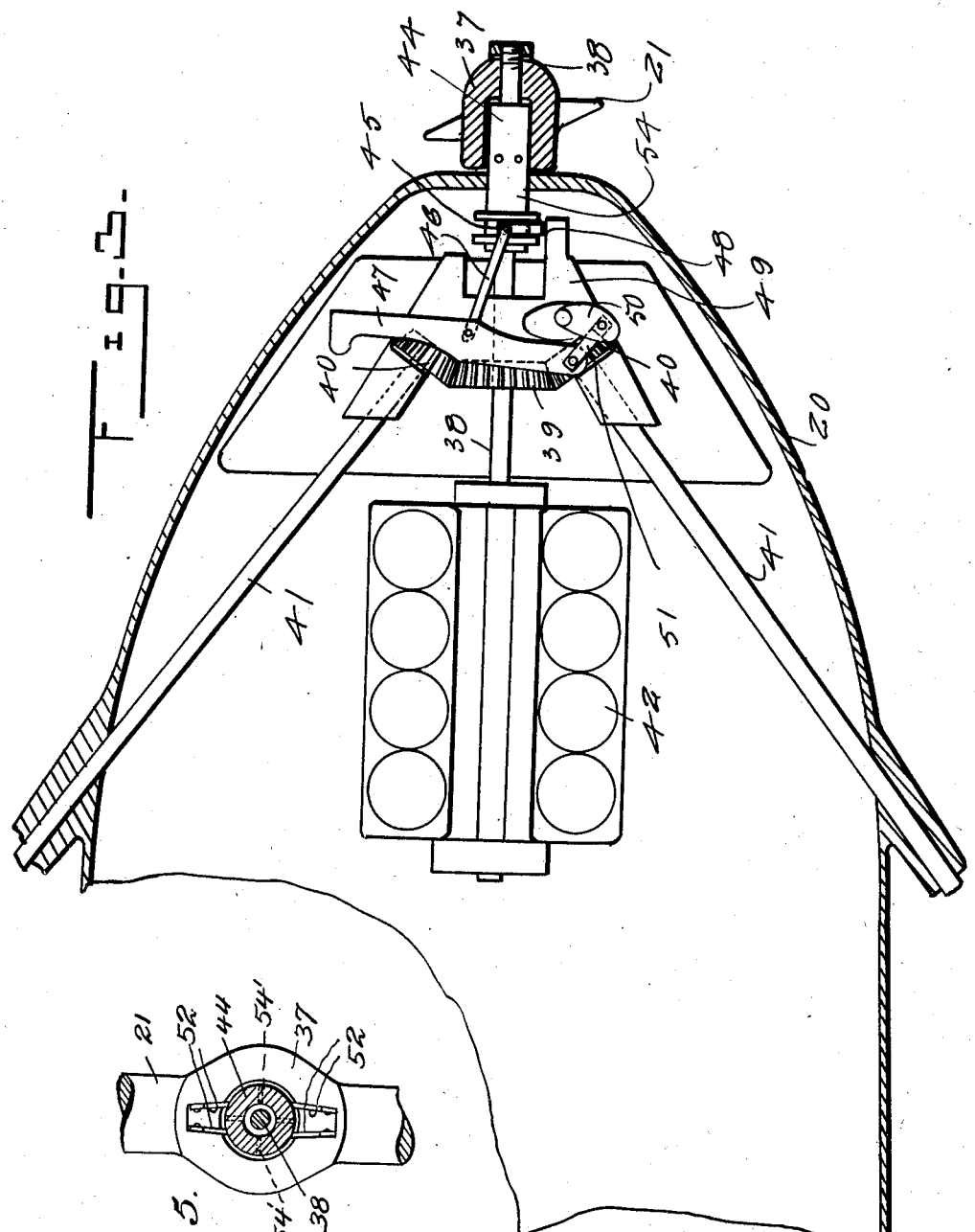

CLAUDIUS MILLARD PETTEY, OF ROARING RIVER, NORTH CAROLINA.

AEROPLANE.

1,360,976.

Specification of Letters Patent. Patented Nov. 30, 1920.

Application filed July 26, 1918. Serial No. 246,886.

*To all whom it may concern:*

Be it known that I, CLAUDIUS M. PETTEY, a citizen of the United States, residing at Roaring River, in the county of Wilkes and State of North Carolina, have invented certain new and useful Improvements in Aeroplanes; and I do hereby declare the following to be a full, clear, and exact description of the invention, such as will enable others skilled in the art to which it appertains to make and use the same.

The object of the invention is to provide a machine of the heavier than air type which is particularly adapted for use as a war plane and which in pursuance of that object is provided with improved means of control of speed, so as to increase the possibilities in the matter of maneuvering.

Further objects and advantages will appear in the course of the following description, it being understood that changes in form, proportion and details in adapting the mechanism to various allied uses may be resorted to within the scope of the appended claims without departing from the spirit of the invention.

In the drawings:

Figure 1 is a side view of an air craft constructed in accordance with the invention.

Fig. 2 is a plan view of the same.

Fig. 3 is a detail horizontal section of the front portion of the body of the machine.

Fig. 4 is a detail sectional view taken longitudinally of the mechanism for imparting motion to the main driving propeller.

Fig. 5 is an inner end view partly in section of the propeller hub.

Fig. 6 is a detail sectional view of the main propeller hub on the plane indicated by the line 7—7 of Fig. 4.

Fig. 7 is a detail view of the female propeller clutch member.

Referring in detail to the drawings, the numeral 20 indicates the fuselage of an aeroplane having steering, supporting and elevating planes thereon, which do not form the subject matter of this present application. The fuselage has arranged at the forward end a main propeller 21 and at either side of which near the forward end and in rear of the main propeller are lateral auxiliary propellers 22.

A hub 37 of the main propeller is preferably hollow as shown, and the propeller shaft 38 which extends therethrough is provided with a gear 39 meshing with corresponding gears 40 on the auxiliary propeller shafts 41, said main propeller or drive shaft 38 being actuated by the engine 42, which may be of any of the well known or approved types capable of high velocity and power. Within the cavity of the hub 37 and upon the drive shaft 38 is arranged a cone 43 forming one member of a friction clutch of which the other or female member 44 embraces the same and is extended within the casing or fuselage and is engaged by a yoke 45 connected by links 46 with an operating lever, preferably a foot lever 47, said yoke being pivotally mounted as at 48 upon a suitable support 49 within the casing, and the foot lever being mounted for swinging movement upon a bracket 50 with which it is connected by a link 51. Said operating lever 47 is within convenient reach of the foot of the operator or pilot, or may, if the dimensions of the machine demand be connected with suitable auxiliary operating means, not shown, which enable the pilot to control the movement thereof in throwing the main propeller into and out of gear with the drive shaft 38. Obviously, when the female or interiorly coned member of the clutch is advanced, the same will gradually take up the revoluble movement of the shaft and through links 52 which are pivotally connected with the hub 37, this revoluble movement will be communicated to the propeller, the inner ends of the said links being engaged with sockets or guides 53 in the sleeve constituting the female member of the clutch. The said female member moreover is preferably longitudinally split as shown at 54' to permit it to yield radially or diametrically as it is engaged with the cone, and when the propeller wheel has completely taken up the speed of rotation of the shaft, the sleeve may be forcibly pressed forward so that the inner ends of the links 52, which constitute locking pins, may be engaged with the surface of the cone or male clutch member to positively lock the two clutch members in engagement. Moreover, the said links 52 are so mounted upon the hub that when thus pressed forward to the limit of movement they are swung beyond the true radial position and thus constitute an eccentric lock which prevents accidental disengagement due to the jarring of the machine. The advantage in employing auxiliary lateral propellers in addition to the main propeller which is designed to maintain a high speed of movement of the machine, is that in engagements particularly involving the dropping of bombs where accuracy is a desideratum, a sufficiently rapid forward movement may be maintained to preserve the buoyancy of the machine without the vibration incident to the operation of the main propeller, and moreover at a speed which is more conducive to accuracy in aiming the guns or discharging the bombs than when a full speed forward is maintained. On the other hand in the event of a rear attack it is possible readily to throw the main propeller into operation and thus increase the speed of movement to the desired extent.

Having described the invention, I claim:

1. An air craft having sustaining planes and guiding elements, a main and auxiliary propellers and driving mechanism for said propellers, the main propeller having a shaft connected with the driving mechanism and provided with a coned clutch member, a coöperating coned clutch member for engagement with that on the propeller shaft and connected with the hub of said main propeller, means for moving one of said clutch members relative to the other to secure engagement and disengagement thereof, and locking means operable by the movable clutch member for securing the same in a fixed relation when the propeller has taken up the full speed of the said shaft.

2. An air craft having sustaining planes and directing means, main and auxiliary propellers and driving mechanism for the same including a shaft for the main propeller, coöperating coned clutch members carried respectively by said shaft and the hub of the main propeller, the propeller carried clutch member being connected therewith by locking pins and being radially expansible, and means for axially moving the propeller carried clutch member relative to the shaft carried member.

3. An air craft having sustaining planes and directing means, main and auxiliary propellers and driving mechanism for the same including a shaft for the main propeller, the hub of the latter being loosely mounted upon its shaft, friction clutch members carried respectively by said main propeller hub and shaft, and means for moving the hub carried clutch member axially with reference to the other to cause engagement thereof and communication of motion from the shaft to the propeller, said hub carried clutch member being connected with the propeller hub by radial swinging links forming locking pins for an engagement with the shaft carried clutch member when said clutch members are in propeller driving relation.

In testimony whereof I affix my signature in the presence of two witnesses.

CLAUDIUS M. PETTEY.

Witnesses:
MERCIE PRINETTE,
MARCUS PRINETTE.